(12) United States Patent
Naik

(10) Patent No.: US 6,958,587 B1
(45) Date of Patent: Oct. 25, 2005

(54) TORQUE DISTRIBUTION FOR MULTIPLE PROPULSION SYSTEM VEHICLES

(75) Inventor: Sanjeev M. Naik, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/937,088

(22) Filed: Sep. 9, 2004

(51) Int. Cl.$^7$ ............................................. H02P 7/00
(52) U.S. Cl. ...................... 318/432; 318/433; 318/139; 318/52; 180/65.2; 180/65.3
(58) Field of Search ................. 318/430–433, 318/139, 52, 111; 180/65.1–65.5

(56) References Cited

U.S. PATENT DOCUMENTS

| | | | |
|---|---|---|---|
| 3,764,867 A * | 10/1973 | Smith | 318/52 |
| 4,012,677 A * | 3/1977 | Rist et al. | 318/149 |
| 4,747,269 A * | 5/1988 | David | 60/445 |
| 5,258,912 A | 11/1993 | Ghoneim et al. | |
| 5,632,534 A * | 5/1997 | Knechtges | 303/152 |
| 6,133,700 A * | 10/2000 | Kumar | 318/85 |
| 6,325,469 B1 | 12/2001 | Carson et al. | |
| 6,664,751 B1 * | 12/2003 | Gabriel et al. | 318/599 |
| 6,831,429 B2 * | 12/2004 | Fu | 318/139 |

* cited by examiner

Primary Examiner—Rina Duda
(74) Attorney, Agent, or Firm—Kathryn A. Marra

(57) ABSTRACT

A vehicle has multiple electrical propulsion systems. Torque is split among the various propulsion systems to meet a variety of requirements and limitations including operator demand, vehicular traction limits, electric machine torque capabilities, machine efficiency operating points and available electrical power.

11 Claims, 2 Drawing Sheets

TORQUE DISTRIBUTION FOR MULTIPLE PROPULSION SYSTEM VEHICLES

TECHNICAL FIELD

The present invention is related to electric propulsion vehicles. More particularly, the invention is concerned with optimal torque distribution among multiple propulsion systems in accordance with various constraints.

BACKGROUND OF THE INVENTION

Vehicles having multiple propulsion systems are characterized by two or more independently operable sources of tractive torque. Most typically, one propulsion system is associated with driving a front set of tires with a first electric machine and another propulsion system is associated with driving a back set of tires with a second electric machine. However, systems are known having electric machines associated with each of the tires of a vehicle. Vehicle dynamics control has been an area of substantial focus in such multiple propulsion system vehicles. Efficiency improvements in such vehicles have mostly come from improved electric machine designs, power electronics improvements (including improved power controls), power sources and power distribution control in systems having multiple power sources.

SUMMARY OF THE INVENTION

The present invention approaches system efficiency optimization of a multiple propulsion system vehicle in real-time considering operator demands, vehicle dynamics and propulsion system capabilities. Torque is distributed among the various ones of the multiple propulsion systems to meet the operator demands, tractive capabilities, machine torque capabilities, minimal overall electric machine power loss and electrical power availability.

A vehicle includes a source of electrical power and multiple electrical propulsion systems. A control method for distributing tractive torque among the multiple propulsion systems includes providing a tractive torque request which may be based on an operator demand and may be limited by traction limits at the tire and road surface. Complementary tractive torques for the propulsion systems operative to effect the tractive torque request are determined. The complementary tractive torques may be determined in accordance with electrical machine torque limitations. The complementary tractive torques meeting predetermined efficiency criteria are selected for use in controlling the propulsion systems in accordance with said selected set of complementary tractive torques. Preferably, the efficiency criteria include the lowest combined machine power loss. The complementary selected tractive torques further may be scaled in accordance with available electrical power.

DESCRIPTION OF THE PREFERRED EMBODIMENT

Figure 1:
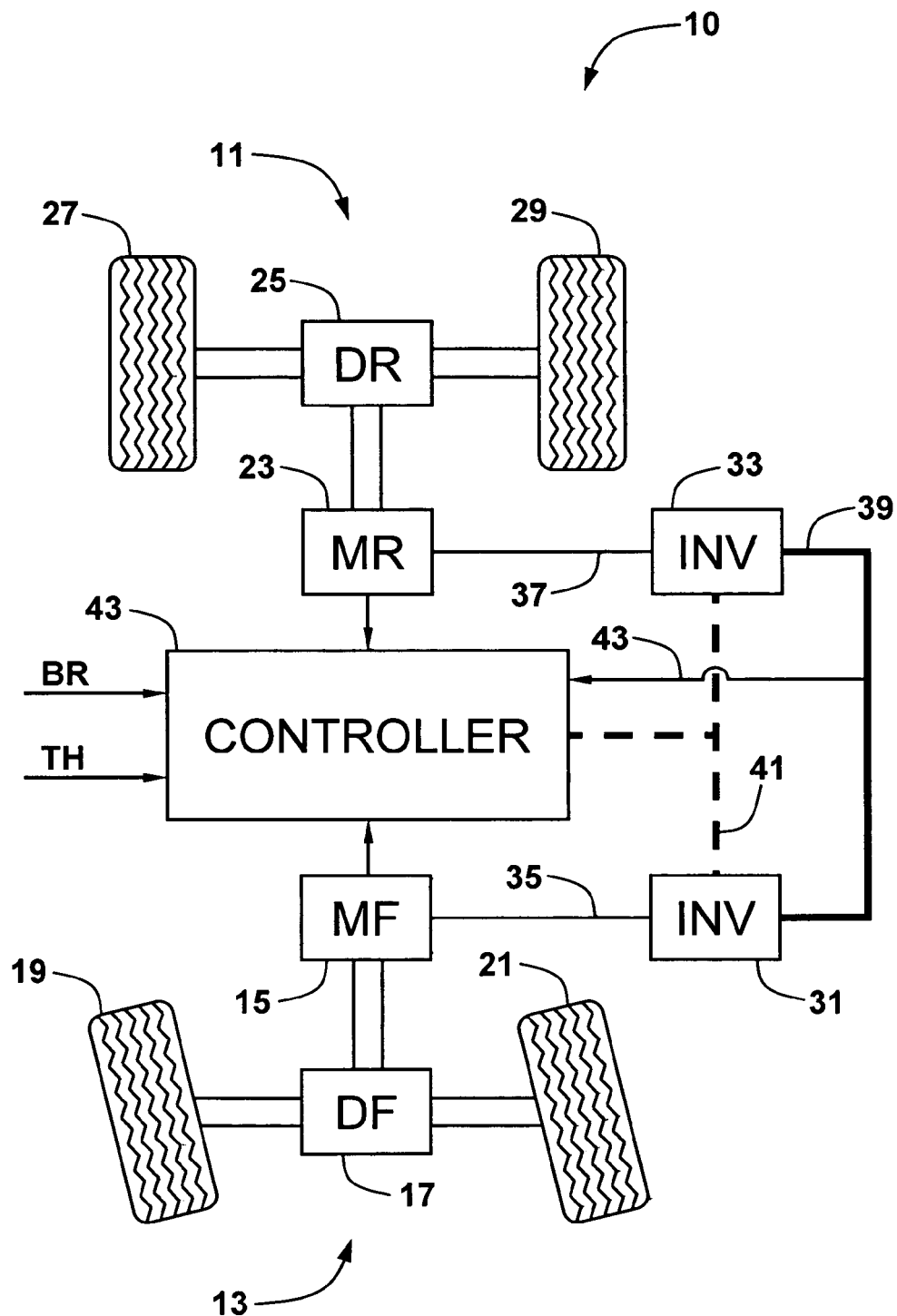
FIG. 1 is a schematic diagram of an exemplary dual-propulsion system vehicle including front and rear propulsion systems in accordance with the present invention.

Beginning with reference to FIG. 1, an exemplary dual-propulsion system vehicle 10 includes a front electric propulsion system 13 and a rear electric propulsion system 11. The front propulsion system includes multiphase AC electric machine MF 15 mechanically coupled to final drive train DF 17 which may include such common elements as reduction and differential gearing. Final drive train 17 is mechanically coupled to traction wheels 19, 21. The front propulsion system is operative to provide propulsion torque at the traction wheels via electric machine MF 17 motor operation or to provide braking torque at the traction wheels via electric machine MF 17 generator operation. Similarly, the rear propulsion system includes multiphase AC electric machine MR 23 mechanically coupled to final drive train DR 25 which may include such common elements as reduction and differential gearing. Final drive train 25 is mechanically coupled to traction wheels 27, 29. The rear propulsion system is operative to provide propulsion torque at the traction wheels via electric machine MR 23 motor operation or to provide braking torque at the traction wheels (i.e. regenerative braking) via electric machine MR 17 generator operation. Other electric machines, for example the brushless DC variety, may serve as the electric machines in the present system.

Each electric machine has associated therewith a respective machine controller 31, 33. Machine controllers include power inverter electronics and respective motor controllers configured to receive motor control commands and control inverter states therefrom for providing motor or generator functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC bus 39 and provides AC current to the respective motor over phase lines 35 or 37. In generator control, the respective inverter receives AC current from the corresponding motor over phase lines 35 or 37 and provides current to the DC bus 39.

DC bus 39 is coupled to at least one source of electrical potential including, for example, batteries and fuel cells. While as single common bus source for electrical potential is illustrated, independent electrical sources of electrical potential may be employed for sourcing the front and rear propulsion systems.

Each motor controller 31, 33 communicates with system controller 43, for example via controller area network (CAN) bus 41. The CAN bus 41 allows for communication of control parameters and commands between the system controller, motor controllers and other controllers (not shown) such as antilock brake and traction controllers. System controller is microprocessor based comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. System controller 43 monitors various parameters for use in the control functions, including operator inputs such as brake effort BR and throttle request TH. Other system parameters including bus voltage V and front and rear electric machine speeds NF and NR, respectively, are also monitored by controller 43.

Figure 2:
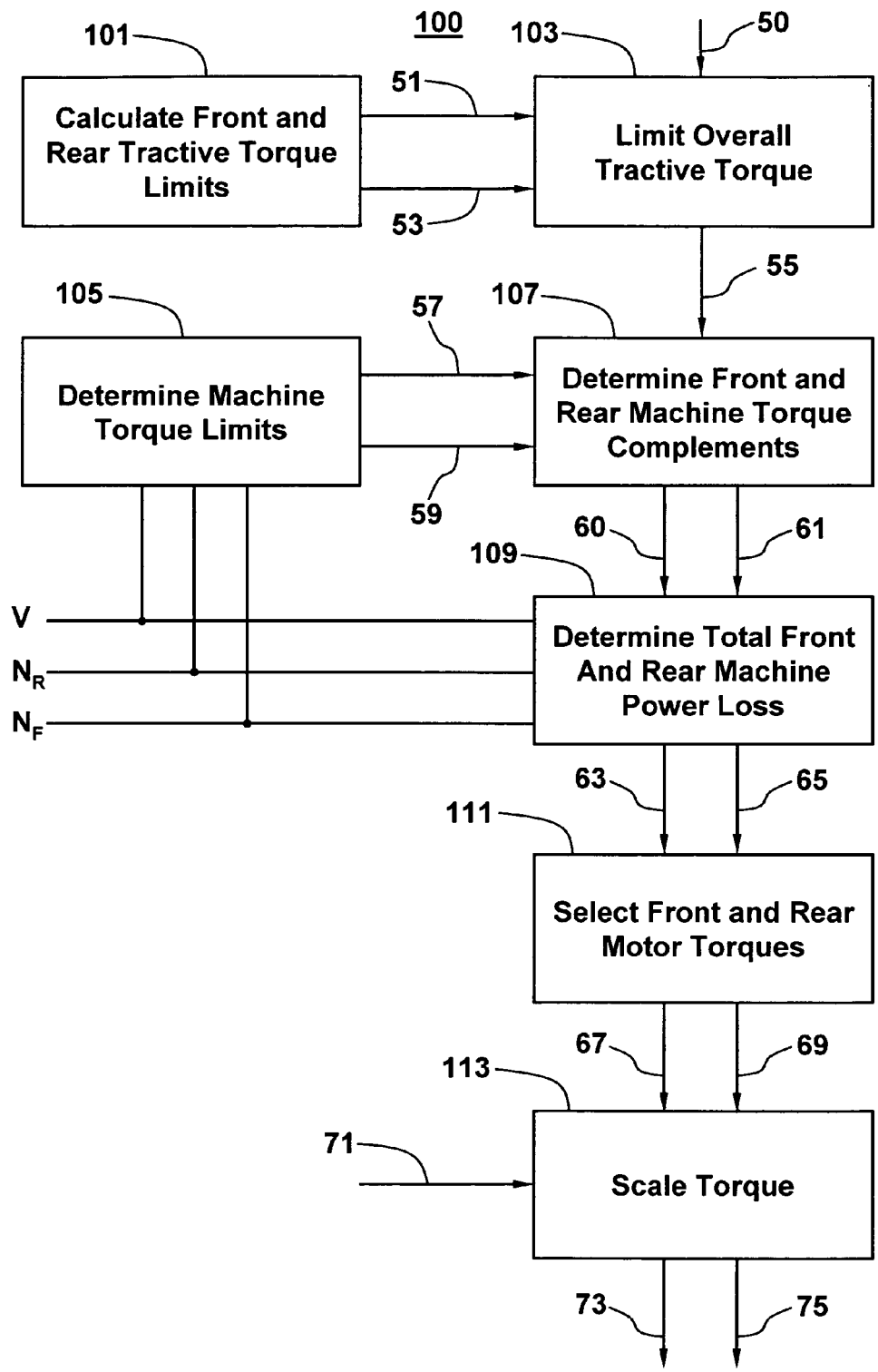
FIG. 2 is a block diagram representing various exemplary control tasks for implementing torque distribution control in accordance with the present invention.

Having thus described an exemplary environment for implementing the control of the present invention, attention is now turned to FIG. 2 wherein a block diagram illustrates exemplary steps 100 used in the determination of optimum torque distribution between front and rear electrical propulsion systems. A variety of inputs are monitored from which a measure of desired longitudinal force 50 is derived. For example, vehicle operator inputs including throttle TH and brake BR operation provide key indicia of the desired longitudinal force and the propulsion or braking characteristic thereof. Vehicle speed and gear selection for effecting speed ratio, range and directional settings of the vehicle (e.g. P, R, N, OD, D, 2, 1) are also monitored and provide additional indicia of the desired longitudinal force. Vehicle speed may be derived, for example, from one or more conventional wheel rotation sensors (not shown) or rotation sensing of other driveline members including electric machine rotation. Electric machine rotation may be derived via conventional hardware sensing techniques or through inverter phase information in the case of multi-phase AC machines.

At block 101, front and rear wheel sets tractive torque limits 51, 53 are independently determined, preferably in accordance with dynamic vehicle and road surface conditions such as vehicle speed, net vehicular acceleration (accounting for speed and directional changes), and road condition limits.

At block 103, front and rear limitations are combined to provide overall tractive torque limits. Wheel slip at the road surface occurs at the tractive torque limits of the wheels and corresponds substantially to limitations on the longitudinal forces effectively applicable to the vehicle at the wheels. Front and rear tractive torque limits therefore may limit the actual longitudinal forces that may effectively be applied at the wheel to road interface. Therefore, the requested tractive torque 55 output from this block is the tractive torque corresponding to the desired longitudinal force as may be attenuated by tractive torque limits.

Achieving the requested tractive torque 55 can be with a variety of torque splits between front and rear wheels within the tractive limits established. Another set of limits related to the front and rear electric propulsion systems can affect the tractive torque that may effectively be applied to the vehicle wheels. Therefore, at block 105, electric machine torque limits 57, 59 are determined in accordance with various known propulsion system parameters. In the illustrated embodiment, electric machine speeds NF, NF and bus voltage V are used to reference characteristic minimum and maximum machine torque data for the front and rear propulsion system torque limits 57, 59. Additional reference variables, for example machine temperature, may provide further refinement to the characteristic machine torque data. Such characteristic machine torque data may be empirically derived from conventional dynamometer testing of the combined electric machine and power electronics and reduced to pre-stored table format.

At block 107, a plurality of torque vectors for the front and rear propulsion systems that are within the front and rear machine torque limits 57, 59 and requested tractive torque 55 are synthesized for evaluation in accordance with efficiency considerations of the propulsion system. From the propulsion system torque vectors and the requested tractive torque 55 are derived a plurality of complementary propulsion torque vectors for the front and rear machines. Block 107 outputs complementary pairs of front and rear torque vectors 60, 61 effective to establish the requested tractive torque 55.

In the illustrated embodiment, electric machine speeds NF, NR and bus voltage V are used to reference characteristic power loss data (Ploss) for the front and rear propulsion systems for complementary pairs of torque vectors at block 109. Such characteristic loss data may be empirically derived from conventional dynamometer testing of the combined electric machine and power electronics and reduced to pre-stored table format. The loss data for the front and rear complementary torque vector pairs 63, 65 are aggregated and the torque vector pair associated with the smallest aggregate loss is selected as the preferred operational torque vector complement 67, 69 for the front and rear propulsion systems of the vehicle.

The electrical power limits 71 of the vehicle are next compared with the torque vector pairs 67, 69 to determine whether the preferred torque vector complement can be effected within the electrical constraints. If necessary, the preferred torque vector complement is scaled to comply with the available electric power and a scaled torque vector pair 73, 75 is provided for use in commanding the front and rear electric machines.

The present invention has been described with respect to certain preferred embodiments. However, these embodiments are intended as non-limiting examples of the invention, it being recognized that alternative implementations are within the scope of the invention. For example, while front and rear propulsion systems have been described, each wheel of a vehicle may have its own associated electric machine for practicing the present invention. Accordingly, it is intended that the invention not be limited to the disclosed embodiments, but that it have the fill scope permitted by the language of the following claims.

What is claimed is:

1. Method for distributing tractive torque among multiple propulsion systems in a vehicle comprising:
    providing a tractive torque request;
    determining complementary tractive torques for said propulsion systems operative to effect the tractive torque request;
    selecting a set of said complementary tractive torques meeting predetermined efficiency criteria; and
    controlling said propulsion systems in accordance with said selected set of complementary tractive torques.

2. The method as claimed in claim 1 wherein said tractive torque request is feasible within tractive torque limits of said vehicle.

3. The method as claimed in claim 1 wherein said complementary tractive torques are feasible within predetermined propulsion system constraints.

4. The method as claimed in claim 1 wherein said predetermined efficiency criteria comprises minimum aggregate power loss.

5. The method as claimed in claim 1 wherein controlling said propulsion system further comprises scaling said selected set of complementary tractive torques to meet electrical power constraints of the vehicle.

6. Multiple propulsion system vehicle comprising:
    a source of electrical power;
    a plurality of electric machines operatively coupled to vehicle wheels and effective to provide tractive torque thereto;

a computer based controller including a storage medium having a computer program encoded therein for distributing tractive torque among said electric machines that results in a substantially minimum electric machine power loss, said computer program including code for providing a desired tractive torque for the vehicle;

code for determining complementary torques for said plurality of electric machines effective to meet the desired tractive torque for the vehicle;

code for determining aggregate electric machine power losses for the complementary torques;

code for selecting the complementary torques having a minimum aggregate electric machine power loss; and, code for controlling the electric machines based on the selected complementary torques.

7. The multiple propulsion system vehicle as claimed in claim 6 wherein the code for providing a desired tractive torque for the vehicle comprises:

code for limiting the desired tractive torque to limit wheel slip.

8. The multiple propulsion system vehicle as claimed in claim 6 wherein the code for determining complementary torques for said plurality of electric machines comprises:

code for limiting complementary torques to meet electric machine torque limitations.

9. The multiple propulsion system vehicle as claimed in claim 6 further comprising:

code for scaling the selected complementary torques based on electrical power available from said source of electrical power.

10. Method for controlling multiple traction motors in a vehicle comprising:

providing a total traction torque request based on operator demand and vehicular traction limits;

determining multiple combinations of individual traction motor torques capable of providing the total traction torque request;

aggregating individual traction motor power losses for each of said multiple combinations of individual traction motor torques; and, controlling the multiple traction motors based on the one of said multiple combinations of individual traction motor torques having the lowest aggregate power loss.

11. Method for controlling multiple traction motors in a vehicle as claimed in claim 10 wherein said multiple combinations of individual traction motor torques are determined in accordance with predetermined traction motor torque limitations.

* * * * *